United States Patent
Arakane

(10) Patent No.: US 10,675,896 B2
(45) Date of Patent: Jun. 9, 2020

(54) IMAGE RECORDING APPARATUS

(71) Applicant: BROTHER KOGYO KABUSHIKI KAISHA, Nagoya-shi, Aichi-ken (JP)

(72) Inventor: Satoru Arakane, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/354,548

(22) Filed: Mar. 15, 2019

(65) Prior Publication Data
US 2019/0291485 A1    Sep. 26, 2019

(30) Foreign Application Priority Data
Mar. 26, 2018  (JP) .................................. 2018-058234

(51) Int. Cl.
B41J 19/14    (2006.01)
B41J 2/21     (2006.01)
G06K 15/10    (2006.01)

(52) U.S. Cl.
CPC ........... B41J 19/147 (2013.01); B41J 2/2132 (2013.01); G06K 15/107 (2013.01)

(58) Field of Classification Search
CPC ...... B41J 19/147; B41J 2/2132; G06K 15/107
See application file for complete search history.

(56) References Cited

U.S. PATENT DOCUMENTS

| | | |
|---|---|---|
| 2009/0262375 A1 | 10/2009 | Yuda et al. |
| 2010/0214336 A1* | 8/2010 | Kuno .................... B41J 19/147 347/12 |
| 2015/0352873 A1 | 12/2015 | Yoshida |
| 2017/0282549 A1 | 10/2017 | Arakane et al. |

FOREIGN PATENT DOCUMENTS

| | | |
|---|---|---|
| JP | H11-188898 A | 7/1999 |
| JP | 2009-262342 A | 11/2009 |
| JP | 2015-229284 A | 12/2015 |
| JP | 2017-177774 A | 10/2017 |

* cited by examiner

*Primary Examiner* — Geoffrey S Mruk
(74) *Attorney, Agent, or Firm* — Scully, Scott, Murphy & Presser, PC

(57) ABSTRACT

There is provided an image recording apparatus, including: a conveyer; a carriage; a recording head having at least three nozzle rows; and a controller. When a moving direction of the carriage in one of two continuous recording passes is different from that in the other of the two continuous recording passes, the image recording apparatus conveys a recording medium in the conveyance direction so that two recording areas partially overlap with each other. When a line image, which belongs to an overlap area, is recorded, the image recording apparatus executes recording so that the two continuos recording passes complement each other, and forms at least part of dots in the line image in accordance with a landing order different from a landing order used when the image is recorded in a non-overlap area included in the recording areas and different from the overlap area.

9 Claims, 11 Drawing Sheets

RECORDING METHOD BY WHICH DIFFERENCE IN COLOR BETWEEN IMAGES IS CONSPICUOUS

RECORDING METHOD BY WHICH DIFFERENCE IN COLOR BETWEEN IMAGES IS INCONSPICUOUS

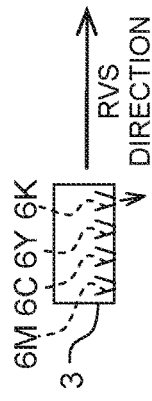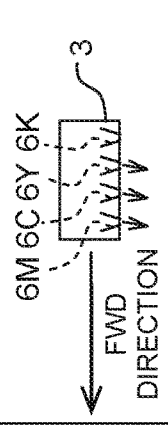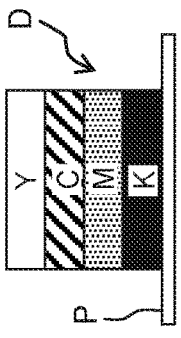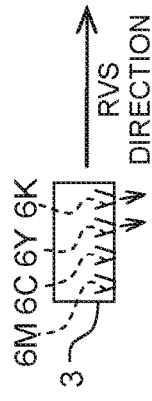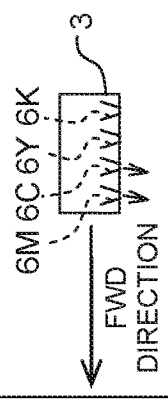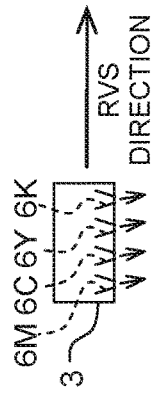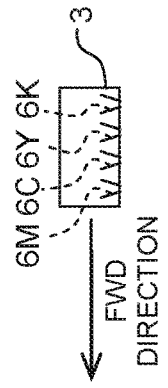

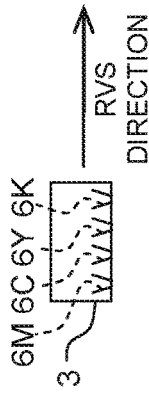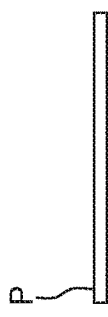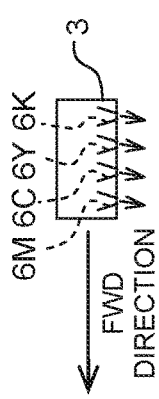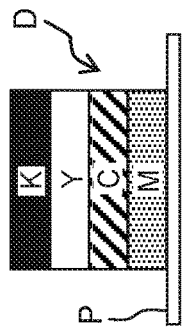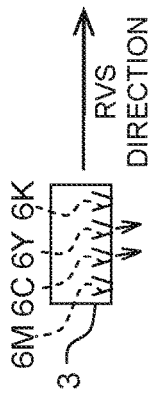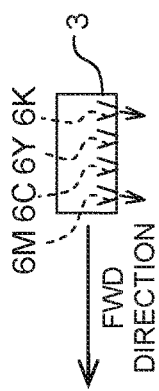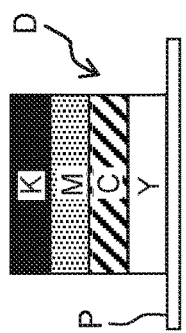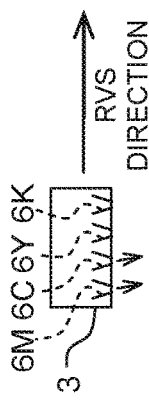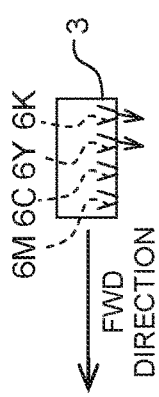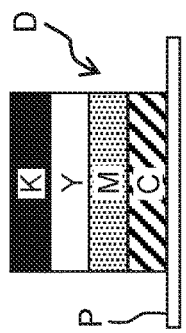
Fig. 5A  Fig. 5B  Fig. 5C

IMAGE RECORDING APPARATUS

CROSS REFERENCE TO RELATED APPLICATION

The present application claims priority from Japanese Patent Application No. 2018-058234 filed on Mar. 26, 2018, the disclosure of which is incorporated herein by reference in its entirety.

BACKGROUND

Field of the Invention

The present disclosure relates to an image recording apparatus.

Description of the Related Art

As an image recording apparatus recording an image, there is publicly known an ink-jet printer that records an image by discharging an ink from an ink-jet head onto a recording medium. In the publicly-known ink-jet printer, the ink-jet head includes four nozzle rows formed from multiple nozzles. The four nozzle rows are arranged in a scanning direction. Inks of different colors are discharged from the four nozzle rows, respectively. Recording is executed on a recording sheet (an exemplary recording medium) by alternately repeating a scan printing operation and a conveyance operation. In the scan printing operation, each of the inks is discharged from the corresponding one of the four nozzle rows during movement in the scanning direction of a carriage carrying the ink-jet head. In the conveyance operation, the recording sheet is conveyed in a conveyance direction intersecting with the scanning direction. In the publicly known ink-jet printer, a boundary between images printed by scan printing operations is less likely to have a gap by adjusting jetting timing of ink from each nozzle row in each scan printing operation and a conveyance amount of the recording sheet in the conveyance operation.

SUMMARY

In the publicly known ink-jet printer, a moving direction in the scanning direction of the carriage in one of two continuous scan printing operations is different from a moving direction in the scanning direction of the carriage in the other of the two continuous scan printing operations. Thus, a landing order of inks of the respective colors when each of the inks is discharged on the recording sheet from the corresponding one of the four nozzle rows in one of the two continuous scan printing operations is opposite to that in the other of the two continuous scan printing operations. This may make deterioration of an image quality, such as unevenness in concentration (density) due to the difference in color, conspicuous. The difference in color may be caused by various ink landing orders at a boundary between images printed by two continuous scan printing operations.

An object of the present disclosure is to provide an image recording apparatus that makes deterioration of an image quality on a recording medium inconspicuous.

According to an aspect of the present disclosure, there is provided an image recording apparatus, including: a conveyer configured to convey a recording medium in a conveyance direction; a carriage configured to move in a scanning direction intersecting with the conveyance direction; a recording head carried on the carriage and having at least three nozzle rows, each of the nozzle rows having a plurality of nozzles arrayed in the conveyance direction, the nozzle rows being configured to discharge different kinds of liquids, the at least three nozzle rows being arranged in the scanning direction, and a controller configured to control the conveyer, the carriage, and the recording head to record an image on the recording medium by alternatingly executing a recording pass, in which the recording head discharges the liquids from the at least three nozzle rows to the recording medium during the movement of the carriage in the scanning direction, and a conveyance operation in which the conveyer conveys the recording medium in the conveyance direction. In a case that the image is recorded, that the recording pass is executed twice continuously, and that a moving direction in the scanning direction of the carriage in one of the two continuous recording passes is different from a moving direction in the scanning direction of the carriage in the other of the two continuous recording passes, (a) the controller is configured to control the conveyer to convey the recording medium in the conveyance direction in the conveyance operation so that two recording areas in the recording medium where the image is recorded by the two continuous recording passes, partially overlap with each other, (b) in a preceding recording pass of the two continuous recording passes, in a case that a line image corresponding to one line, which includes a plurality of dots arranged in the scanning direction and belongs to a first non-overlap area which is included in the recording area of the preceding recording pass and which does not overlap with the recording area of a succeeding recording pass of the two continuous recording passes, is recorded, the controller is configured to form each of the dots in accordance with a first landing order in which each of the liquids is discharged from one of the nozzle rows in order starting from the nozzle row which is included in the at least three nozzle rows and positioned at the most downstream side in the moving direction in the scanning direction of the carriage in the preceding recording pass, (c) in the succeeding recording pass of the two continuous recording passes, in a case that the line image, which belongs to a second non-overlap area which is included in the recording area of the succeeding recording pass and which does not overlap with the recording area of the preceding recording pass, is recorded, the controller is configured to form each of the dots in accordance with a second landing order in which each of the liquids is discharged from one of the nozzle rows in order starting from the nozzle row which is included in the at least three nozzle rows and positioned at the most downstream side in the moving direction in the scanning direction of the carriage in the succeeding recording pass, and (d) in a case that the line image, which belongs to an overlap area where the two recording areas for the two continuous recording passes overlap with each other, is recorded, the controller is configured to execute recording so that the preceding recording pass and the succeeding recording pass complement each other, and to cause the liquids to be discharged from the at least three nozzle rows so that at least part of the dots in the line image is formed in accordance with a landing order different from the first landing order and the second landing order.

In the above configuration, the line image in the overlap area interposed between the two non-overlap areas for the two continuous recording passes includes the dot formed by the landing order different from the first and second landing orders that correspond to the two non-overlap areas. Namely, the dot formed in the overlap area in accordance with the landing order different from the first and second landing orders is interposed between the dots formed in the two non-overlap areas. As a result, it is possible to make deterioration of an image quality, which is caused at a boundary between the recording areas for the two continuous recording passes due to various liquid landing orders, inconspicuous.

BRIEF DESCRIPTION OF THE DRAWINGS

FIG. 4A illustrates ink discharge processing in two continuous recording passes in accordance with Landing Order 1, FIG. 4B illustrates ink discharge processing in two continuous recording passes in accordance with Landing Order 2, and FIG. 4C illustrates ink discharge processing in two continuous recording passes in accordance with Landing Order 3.

FIG. 5A illustrates ink discharge processing in two continuous recording passes in accordance with Landing Order 4, FIG. 5B illustrates ink discharge processing in two continuous recording passes in accordance with Landing Order 5, and FIG. 5C illustrates ink discharge processing in two continuous recording passes in accordance with Landing Order 6.

DESCRIPTION OF THE EMBODIMENTS

Figure 1:
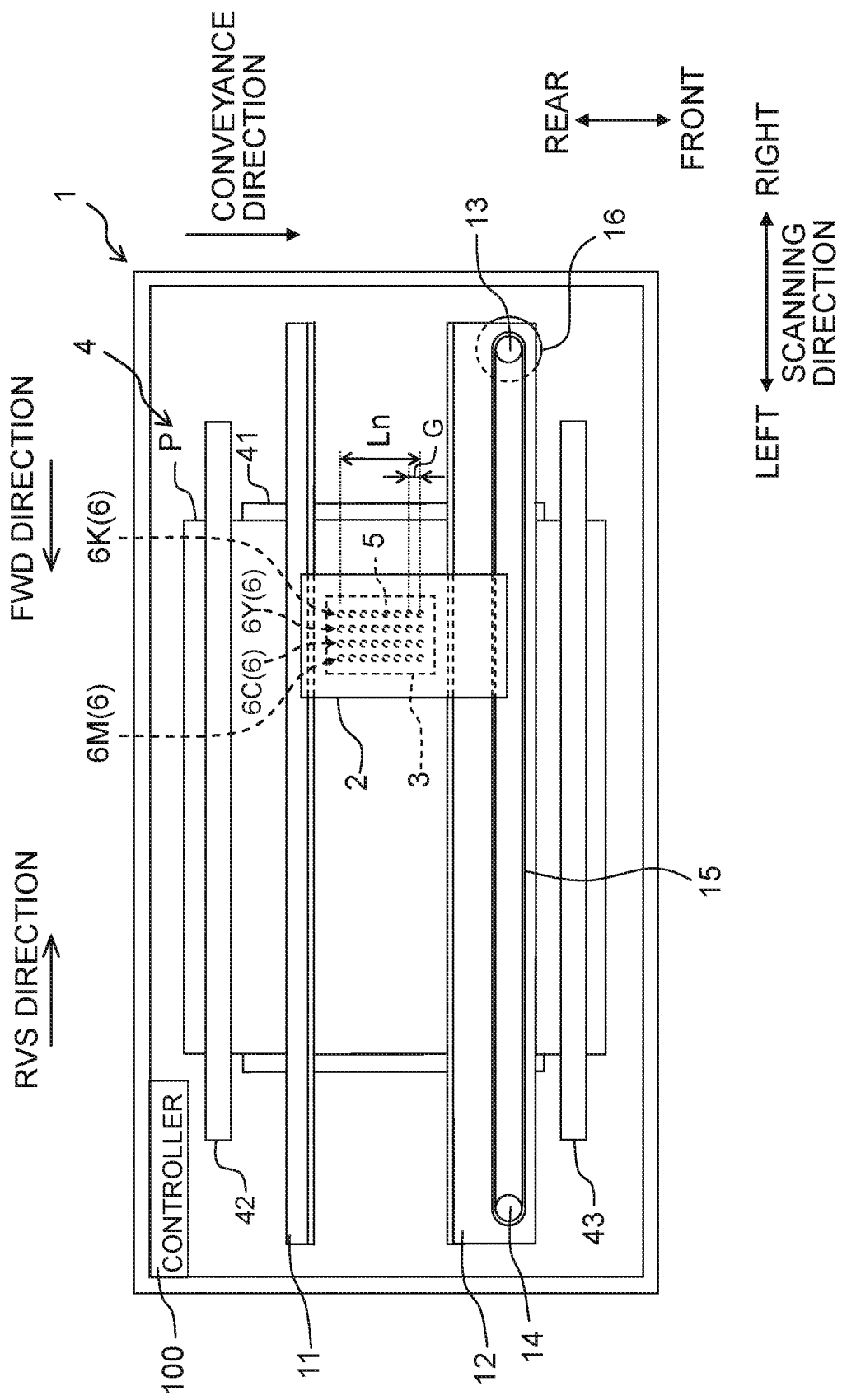
FIG. 1 is a schematic plan view of an ink-jet printer.

In the following, an ink-jet printer 1 is explained as an exemplary image recording apparatus. As depicted in FIG. 1, the ink-jet printer 1 includes a carriage 2, an ink-jet head 3 (a recording head of the present disclosure), a conveyance mechanism 4 (a conveyer of the present disclosure), a controller 100, and the like. A front-rear direction and a left-right direction, depicted in FIG. 1, orthogonal to each other are defined as a front-rear direction and a left-right direction of the printer 1. The following explanation appropriately uses the front (side), the rear (side), the left (side), and the right (side) defined as described above.

The carriage 2 is supported by two guide rails 11 and 12 extending in the left-right direction so that the carriage 2 is movable in the left-right direction. Both ends in the left-right direction of an upper surface of the guide rail 12 are provided with pulleys 13 and 14. An endless belt 15 made using a rubber material is wound around the pulleys 13 and 14. The right pulley 13 is connected to a carriage motor 16.

Rotating the carriage motor 16 normally and reversely rotates the pulleys 13 and 14, which causes the belt 15 to travel. The travel of the belt 15 causes the carriage 2 to reciprocate in the left-right direction, which is a scanning direction. Specifically, rotating the carriage motor 16 normally moves the carriage 2 from the right to the left (FWD direction), rotating the carriage motor 16 reversely moves the carriage 2 from the left to the right (RVS direction).

The ink-jet head 3 (hereinafter simply referred to as the head 3), which is carried on the carriage 2, reciprocates in the scanning direction together with the carriage 2. A lower surface of the head 3 is provided with nozzles 5 from which ink is discharged. The nozzles 5 are arrayed in a conveyance direction (front-rear direction), which is orthogonal to the scanning direction, at regular intervals G, thus forming a nozzle row 6. The nozzle row 6 has a length Ln. The head 3 includes four nozzle rows 6 arranged in the scanning direction. The positions of nozzles 5 of each of the nozzle rows 6 are the same, in the front-rear direction, as the positions of nozzles 5 of the adjacent nozzle row 6. A black ink is discharged from the nozzles 5 belonging to the right-most nozzle row 6, a yellow ink is discharged from the nozzles 5 belonging to the second right-most nozzle row 6, a cyan ink is discharged from the nozzles 5 belonging to the third right-most nozzle row 6, and a magenta ink is discharged from the nozzles 5 belonging to the left-most nozzle row 6.

In the following explanation, components of the ink-jet printer 1 that respectively correspond to black (K), yellow (Y), cyan (C), and magenta (M) inks are assigned with alphabetic suffixes of "K" indicating black, "Y" indicating yellow, "C" indicating cyan, and "M" indicating magenta, respectively. For example, the nozzle row 6 from which the black ink is discharged is referred to as a nozzle row 6K (a specified nozzle row of the present teaching), the nozzle row 6 from which the yellow ink is discharged is referred to as a nozzle row 6Y, the nozzle row 6 from which the cyan ink is discharged is referred to as a nozzle row 6C, and the nozzle row 6 from which the magenta ink is discharged is referred to as a nozzle row 6M. In this embodiment, the black ink is a pigment ink, and the yellow, cyan, and magenta inks are dye inks.

The ink-jet head 3 includes ink channels communicating with the nozzles 5 and an actuator provided with driving elements that apply pressure to the inks in the ink channels to discharge the inks from the nozzle 5. The configuration of the actuator is not particularly limited, and a piezoelectric actuator may be preferably used. The piezoelectric actuator includes piezoelectric elements, as the driving elements, which apply pressure to the inks via deformation of a piezoelectric layer caused by an inverse piezoelectric effect. Or, it is possible to use an actuator including heating elements, as the driving elements, which heat the inks to cause film boiling.

The conveyance mechanism 4 conveys a sheet P frontward. The sheet P is an exemplary recording medium. The conveyance mechanism 4 includes a platen 41, conveyance rollers 42 and 43, a conveyance motor 44 (see FIG. 2), and the like.

The sheet P is placed on an upper surface of the platen 41. The conveyance rollers 42 and 43 are arranged in the front-rear direction with the platen 41 interposed therebetween. The sheet P placed on the upper surface of the platen 41 is conveyed frontward by driving the two conveyance rollers 42 and 43 by use of the conveyance motor 44 so that the rollers 42 and 43 rotate synchronously to each other.

Figure 2:
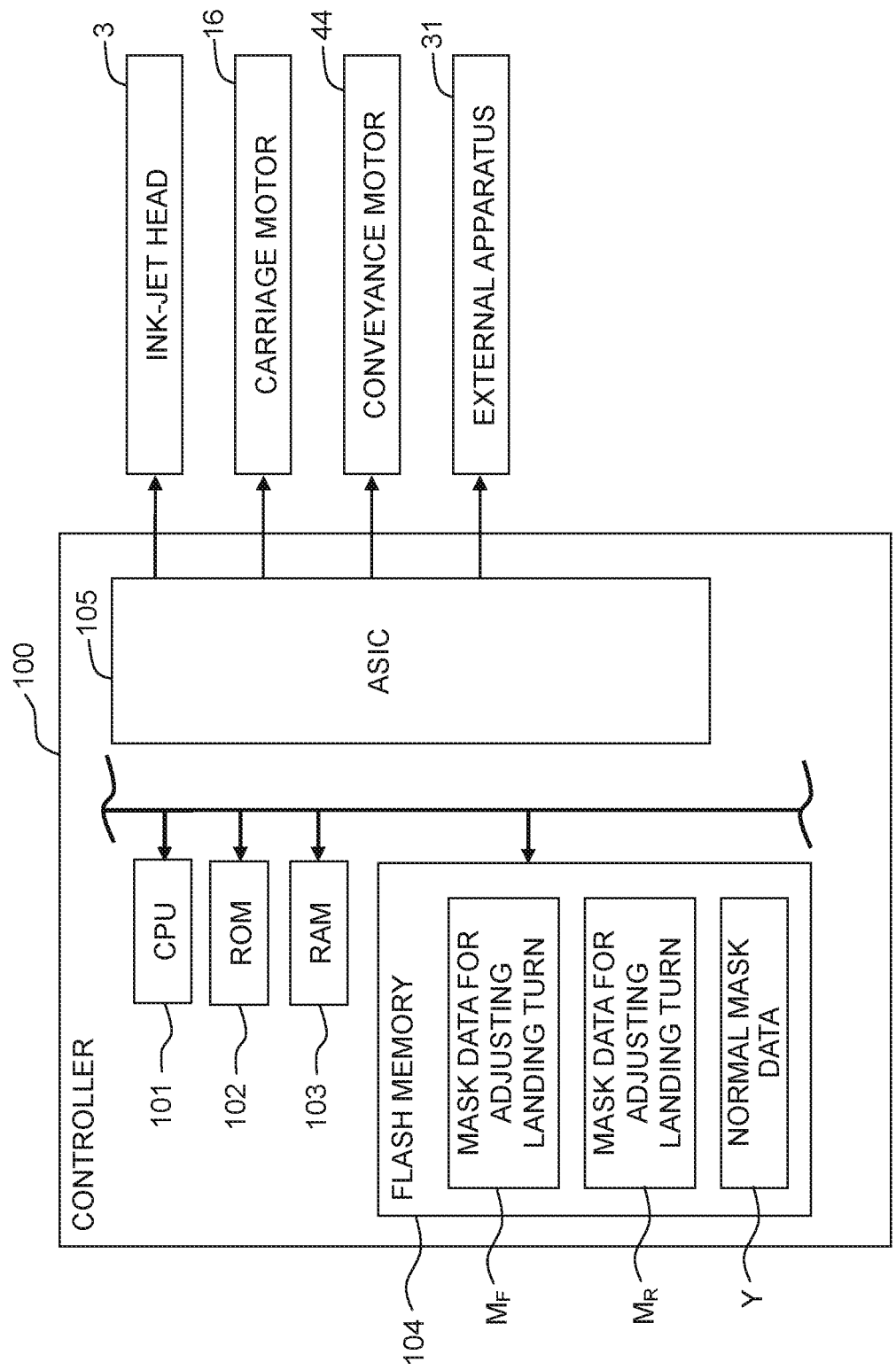
FIG. 2 is a block diagram of an electrical configuration of the ink-jet printer.

As depicted in FIG. 2, the controller 100 includes, for example, a Central Processing Unit (CPU) 101, a Read Only Memory (ROM) 102, a Random Access Memory (RAM) 103, a flash memory 104, and an Application Specific Integrated Circuit (ASIC) 105. The ROM 102 stores programs executed by the CPU 101, various kinds of fixed data, and the like. The RAM 103 temporarily stores data (image data and the like) required for executing the programs. The flash memory 104 stores mask data for adjusting a landing turn $M_F$, mask data for adjusting a landing turn $M_R$, and normal mask data Y, described below. The ASIC 105 is connected to various devices or drive units of the printer 1, such as the head 3, the carriage motor 16, and the conveyance motor 44. The ASIC 105 is connected to an external apparatus 31, such as a PC.

In the controller 100, only the CPU 101 may execute various kinds of processing, only the ASIC 105 may execute various kinds of processing, or the CPU 101 may cooperate with the ASIC 105 to execute various kinds of processing. In the controller 100, the CPU 101 may execute a piece of processing alone, or pieces of the CPU 101 may execute a piece of processing in a shared fashion. Or, the ASIC 105 may execute a piece of processing alone, or pieces of the ASIC 105 may execute a piece of processing in a shared fashion.

When executing the programs stored in the ROM 102, the controller 100 controls operations of the head 3, the carriage motor 16, and the like and executes various kinds of processing. For example, the controller 100 controls, based on a recording command inputted from the external apparatus 31, the head 3, the carriage motor 16, the conveyance motor 44, and the like and executes recording processing for recording, on the sheet P, an image of image data stored in the RAM 103.

In the following, the recording processing is explained in detail. In the recording processing, the controller 100 alternately repeats a recording pass and a conveyance operation, thus recording an image on the sheet P. In the recording pass, ink(s) is/are discharged from the nozzles 5 of the head 3 onto the sheet P while the carriage motor 16 is driven to move the carriage 2 in the scanning direction. In the conveyance operation, the conveyance motor 44 is controlled to convey the sheet P frontward. Namely, the printer 1 is a serial-type printer.

In this embodiment, two recording modes including a unidirectional recording mode and a bidirectional recording mode are used as recording modes for moving directions of the carriage 2. In the recording processing, the controller 100 records an image by selecting any of the unidirectional recording mode and the bidirectional recording mode. The unidirectional recording mode and the bidirectional recording mode are explained below.

In the unidirectional recording mode, ink(s) is/are discharged from the nozzles 5 only when the carriage 2 moves toward a first side in the scanning direction (in this embodiment, the RVS direction). Thus, in the unidirectional recording mode, two recording passes to be executed continuously, among all the recording passes to be executed for recording images on one sheet P, have the same moving direction of the carriage 2. Namely, the moving direction of the carriage 2 during a preceding recording pass of the two continuous recording passes is the same as the moving direction of the carriage 2 during a succeeding recording pass of the two continuous recording passes.

In the bidirectional recording mode, ink(s) is/are discharged from the nozzles 5 both when the carriage 2 moves toward the first side in the scanning direction (in this embodiment, the RVS direction) and when the carriage 2 moves toward a second side in the scanning direction (in this embodiment, the FWD direction). Thus, in the bidirectional recording mode, two recording passes to be executed continuously, among all the recording passes to be executed for recording images on one sheet P, have mutually different moving directions of the carriage 2. The moving directions of the carriage 2 change alternately. Namely, the moving direction of the carriage 2 during the preceding recording pass of the two continuous recording passes is different from the moving direction of the carriage 2 during the succeeding recording pass of the two continuous recording passes.

In the unidirectional recording mode, a return operation in which the carriage 2 moves in the FWD direction needs to be executed after one recording pass is executed by moving the carriage 2 in the RVS direction and before the next recording pass is started. In the bidirectional recording mode, no return operation is required after one recording pass is executed. The throughput of the bidirectional recording mode is thus higher than that of the unidirectional recording mode. However, quality of the image recorded on the sheet P by the bidirectional recording mode is more likely to deteriorate than that by the unidirectional recording mode. For example, the bidirectional recording mode may have the difference in color (hue or tint), due to various ink landing orders, between images recorded by two continuous recording passes.

Figure 3A:
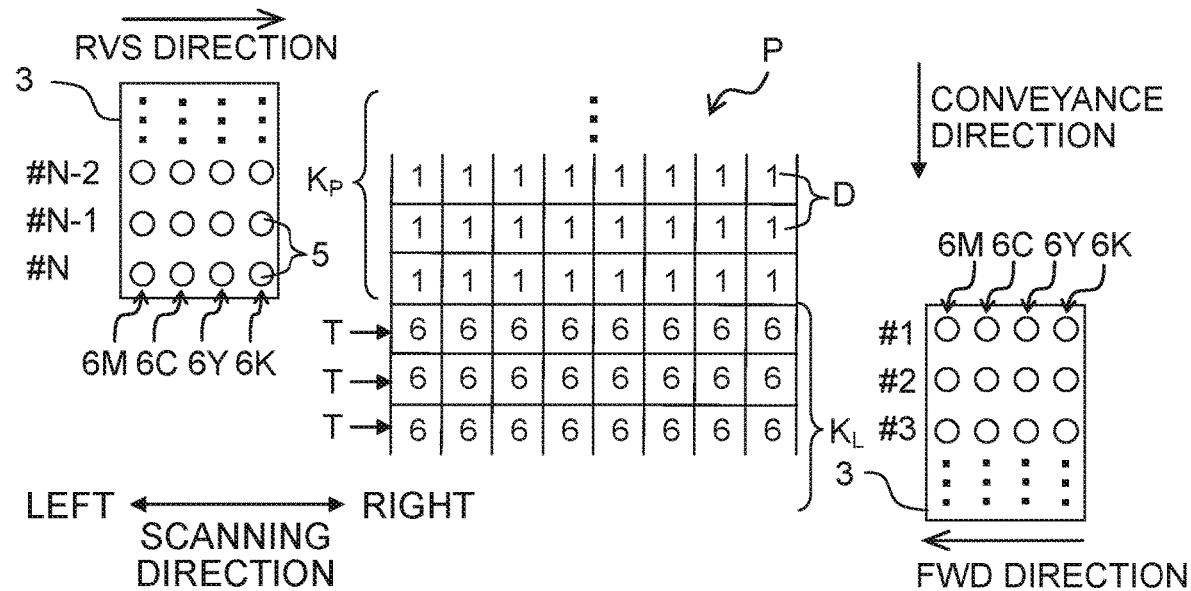
FIGS. 3A and 3B each illustrate landing orders of inks of different colors used when dots are formed in recording areas where images are recorded by two continuous recording passes, and FIGS. 3C to 3H each illustrate an exemplary ink landing order.

Referring to FIG. 3A, the reason why the difference in color is caused between images recorded by two continuous recording passes in the bidirectional recording mode is explained below. In the following, a recording area in which an image is recorded by a preceding recording pass among two continuous recording passes is referred to as a recording area $K_p$, and a recording area in which an image is recorded by a succeeding recording pass among the two continuous recording passes is referred to as a recording area $K_L$. For the purpose of convenience, it is assumed that the moving direction of the carriage 2 in the preceding recording pass is the RVS direction and that the moving direction of the carriage 2 in the succeeding recording pass is the FWD direction.

As depicted in FIG. 3A, when the sheet P is conveyed by an amount corresponding to the length Ln of the nozzle row 6 in the conveyance operation executed between two continuous recording passes, the recording area $K_p$ does not overlap with the recording area $K_L$ and they are adjacent to each other in the conveyance direction. Images recorded in the recording area $K_p$ and the recording area $K_L$ respectively are dots D arrayed in the scanning direction and the conveyance direction. An image corresponding to one line, in which multiple dots D are arranged in the scanning direction to form a row, is a line image T. One line image T is allocated for each nozzle 5.

For the purpose of convenience, the following explanation is made on the assumption that the line image T includes eight dots D arranged in the scanning direction. A number allocated for each dot D in FIGS. 3A and 3B indicates a landing order of inks of the respective colors used when each dot D is formed. Namely, it means that the dot D for which a number 1 is allocated is formed by Landing Order 1 (see FIG. 3C), that the dot D for which a number 2 is allocated is formed by Landing Order 2 (see FIG. 3D), that the dot D for which a number 3 is allocated is formed by Landing Order 3 (see FIG. 3E), that the dot D for which a number 4 is allocated is formed by Landing Order 4 (see FIG. 3F), that the dot D for which a number 5 is allocated is formed by Landing Order 5 (see FIG. 3G), and that the dot D for which a number 6 is allocated is formed by Landing Order 6 (see FIG. 3H).

Here, as described above, the black ink is discharged from the nozzles 5 belonging to the right-most nozzle row 6, the yellow ink is discharged from the nozzles 5 belonging to the second right-most nozzle row 6, the cyan ink is discharged from the nozzles 5 belonging to the third right-most nozzle row 6, and the magenta ink is discharged from the nozzles 5 belonging to the left-most nozzle row 6. In that configuration, the respective inks are discharged from the nozzle rows 6 in the order starting from the right-most nozzle row 6 (from the nozzle row 6 disposed at the most downstream side in the RVS direction) in the preceding recording pass in which the carriage 2 moves in the RVS direction, and thus one dot D on the sheet P is formed by Landing Order 1 (a first landing order of the present disclosure) as depicted in FIG. 3C. In Landing Order 1, the respective inks are discharged from the nozzle rows 6 in the order of black, yellow, cyan, and magenta. Namely, the black, yellow, cyan, and magenta inks overlap with each other on the sheet P in that order from below.

In the succeeding recording pass in which the carriage 2 moves in the FWD direction, the respective inks are discharged from the four nozzle rows 6 in the order starting from the left-most nozzle row 6 (from the nozzle row 6 disposed at the most downstream side in the FWD direction). In that configuration, one dot D on the sheet P is formed by Landing Order 6 (a second landing order of the present disclosure) as depicted in FIG. 3H. In Landing Order 6, the respective inks are discharged from the nozzle rows 6 in the order of magenta, cyan, yellow, and black. Namely, the magenta, cyan, yellow, and black inks overlap with each other on the sheet P in that order from below. Landing Order 1 used when the dot D is formed in the preceding recording pass is a reverse order of Landing Order 6 used when the dot D is formed in the succeeding recording pass. Such different ink landing orders may cause the difference in color between the image recorded in the preceding recording pass and the image recorded in the succeeding recording pass. Namely, although image data represents images having the same color, images recorded on the sheet P may be viewed as images having different colors. In particular, as in this embodiment, when the nozzle row 6K from which the black ink is discharged is arranged at an end in the scanning direction of the four nozzle rows 6, the difference in color between images recorded in two continuous recording passes is likely to be conspicuous. The reason thereof is explained below.

The difference in color caused when a landing turn of the black ink is changed is likely to be more conspicuous than the difference in color caused when a landing turn of each of the other remaining inks is changed. For example, the difference in color between the dot D formed by the inks of four colors in accordance with the landing order in which the black ink has the first landing turn and the dot D formed by the inks of four colors in accordance with the landing order in which the black ink has the last landing turn is relatively large. Meanwhile, the difference in color between the dot D formed by the inks of four colors in accordance with the landing order in which the yellow ink has the first landing turn and the dot D formed by the inks of four colors in accordance with the landing order in which the yellow ink has the last landing turn is relatively small. The reason thereof is considered that the black ink has an optical density higher than those of the other remaining inks. Another reason is considered that the black ink is a pigment ink and the other remaining inks are dye inks. The pigment ink is less likely to permeate the sheet P than the dye inks. In that case, since the pigment ink and the dye inks permeate the sheet P ununiformly, the difference in color between the dot D formed by causing the dye inks to land on the sheet P after landing of the pigment ink and the dot D formed by causing the pigment ink to land on the sheet P after landing of the dye inks may be large.

As described above, in the configuration in which the nozzle row 6K is disposed at the end in the scanning direction of the four nozzle rows 6, the dot D is formed by Landing Order 1, in which the black ink lands on the sheet P first, in one of the two continuous recording passes, and the dot D is formed by Landing Order 6, in which the black ink lands on the sheet P last, in the other of the two continuous recording passes. Namely, the difference in black-ink landing turns between Landing Order 1 and Landing Order 6 is 3, which is the largest. In that case, the difference in color between images recorded by two continuous recording passes is likely to be conspicuous.

The difference in color between two images is inconspicuous when the two images are separated from each other. The difference in color, however, is conspicuous when the two images are adjacent to each other as depicted in FIG. 3A. The controller 100 thus executes, in the bidirectional recording mode, processing for making the difference in color inconspicuous, the difference in color being caused between the image recorded in the preceding recording pass and the image recorded in the succeeding recording pass due to various ink landing orders. The processing is explained below in detail.

Figure 3B:
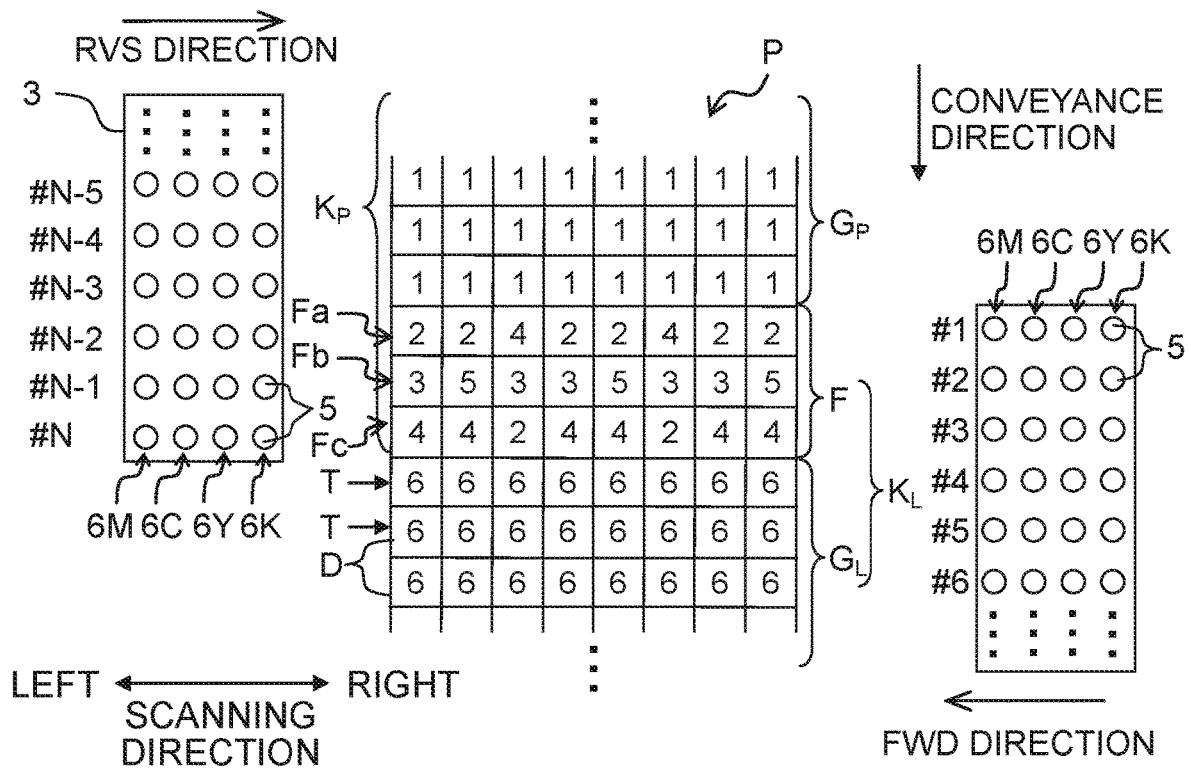
Figure 3C:
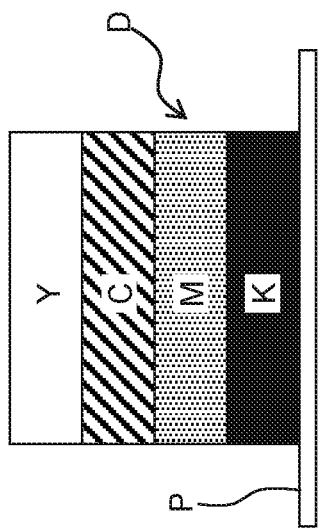
Figure 3D:
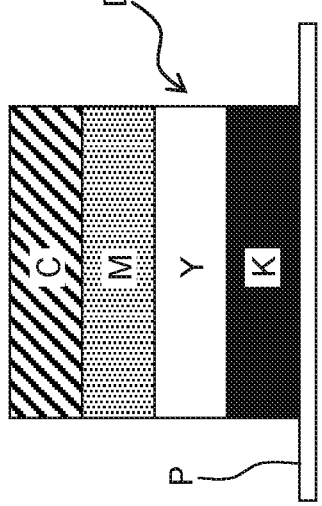
Figure 3E:
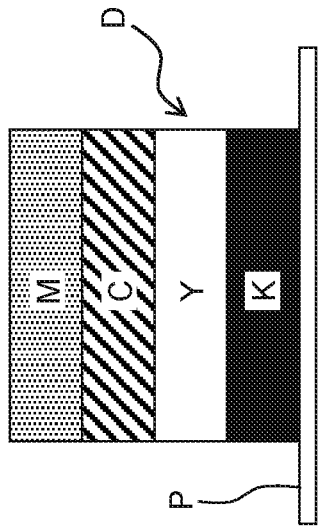
Figure 3F:
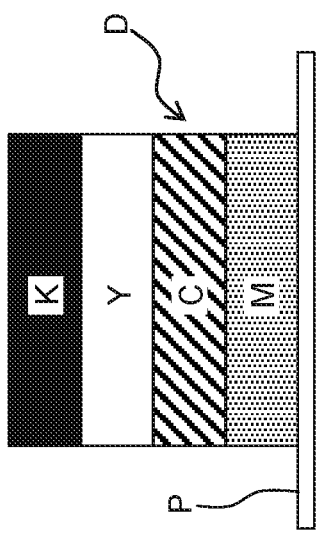
Figure 3G:
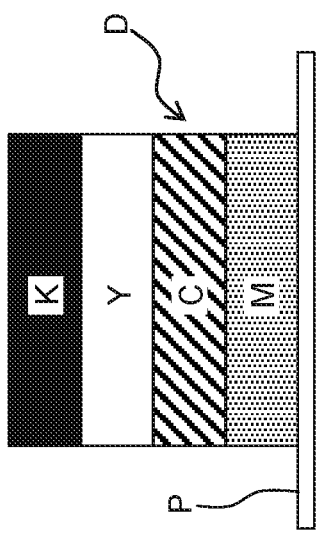
Figure 3H:
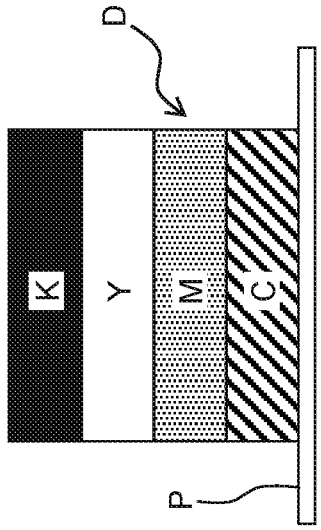

As depicted in FIG. 3B, the controller 100 causes the conveyance mechanism 4 to convey the sheet P by a predefined conveyance amount in the conveyance operation executed between two continuous recording passes so that the recording area $K_p$ partially overlaps with the recording area $K_L$. The predefined amount is set so that an overlap area F, where the recording area $K_p$ overlaps with the recording area $K_L$, includes multiple partial areas each having the line image T corresponding to at least one line. For the purpose of convenience, the following explanation is made on the assumption that the overlap area F includes three partial areas Fa, Fb, and Fc each having the line image T corresponding to one line. Namely, the overlap area F is an area having three line images T. The predefined conveyance amount is a conveyance amount corresponding to a length [Ln−3×G], which is shorter than the length Ln of the nozzle row 6 by an amount three times as long as the nozzle interval G. In the overlap area F, the partial area Fa is disposed on the most upstream side in the conveyance direction, the partial area Fb is disposed on the second most upstream side in the conveyance direction, and the partial area Fc is disposed on the most downstream side in the conveyance direction.

Further, it is assumed that each nozzle row 6 includes N-pieces of nozzle 5 and that symbols #1, #2, #3, . . . , #N−2, #N−1, #N are allocated for the respective nozzles 5 in the order of starting from the most upstream side in the conveyance direction. As depicted in FIG. 3B, in the overlap area F, the nozzles 5 with the symbol #N in the preceding recording pass and the nozzles 5 with the symbol #3 in the succeeding recording pass are allocated for the same line image T. Similarly, the nozzles 5 with the symbol #N−1 in the preceding recording pass and the nozzles 5 with the symbol #2 in the succeeding recording pass are allocated for the same line image T. Further, the nozzles 5 with the symbol

N−2 in the preceding recording pass and the nozzles 5 with the symbol #1 in the succeeding recording pass are allocated for the same line image T.

When the line image T is recorded in a non-overlap area $G_p$ (a first non-overlap area of the present disclosure) that is included in the recording area $K_p$ for the preceding recording pass and is different from the overlap area F, the controller 100 causes the inks of respective colors to be discharged from the four nozzle rows 6 in the preceding recording pass, thus forming each dot D of the line image T in accordance with Landing Order 1, as depicted in FIG. 4A. When the line image T is recorded in a non-overlap area $G_L$ (a second non-overlap area of the present disclosure) that is included in the recording area $K_L$ for the succeeding recording pass and is different from the overlap area F, the controller 100 causes the inks of respective colors to be discharged from the four nozzle rows 6 in the succeeding recording pass, thus forming each dot D of the line image T in accordance with Landing Order 6, as depicted in FIG. 5C.

When the line image T is recorded in the overlap area F, the controller 100 executes recording so that the preceding recording pass and the succeeding recording pass complement each other, and causes the inks of respective colors to be discharged from the four nozzle rows 6 so that each dot D of the line image T is formed by any one of Landing Orders 2 to 5 (see, FIGS. 3D to 3G) different from Landing Orders 1 and 6.

Accordingly, the overlap area F, in which each dot D is formed by any one of Landing Orders 2 to 5 different from Landing Orders 1 and 6, is interposed between the non-overlap area $G_p$ in which each dot D is formed by Landing order 1 and the non-overlap area $G_L$ in which each dot D is formed by Landing Order 6. Namely, since the dot D formed by Landing Order 1 is not adjacent to the dot D formed by Landing Order 6, deterioration of an image quality caused by various ink landing orders can be inconspicuous. The following explanation is made about discharge control of the inks of respective colors in each of the preceding recording pass and the succeeding recording pass when each dot D is formed by any one of Landing Orders 2 to 5.

As depicted in FIG. 4B, in Landing Order 2, inks are discharged from the nozzle rows 6K and 6Y and no inks are discharged from the nozzle rows 6C and 6M in the preceding recording pass. This allows only the black ink and the yellow ink to land on the sheet P in that order in the preceding recording pass. Meanwhile, inks are discharged from the nozzle rows 6C and 6M and no inks are discharged from the nozzle rows 6K and 6Y in the succeeding recording pass. This allows the magenta ink and the cyan ink to land, in that order in the succeeding recording pass, on the black and yellow inks that have already landed on the sheet P. Namely, in Landing Order 2, the dot D is formed by the black, yellow, magenta, and cyan inks that overlap with each other on the sheet P in that order from below.

As depicted in FIG. 4C, in Landing Order 3, ink is discharged from only the nozzle row 6K and no inks are discharged from the nozzle rows 6Y, 6C, and 6M in the preceding recording pass. Meanwhile, inks are discharged from the nozzle rows 6M, 6C, and 6Y and no ink is discharged from the nozzle row 6K in the succeeding recording pass. Namely, in Landing Order 3, the dot D is formed by the black, magenta, cyan, and yellow inks that overlap with each other on the sheet P in that order from below.

As depicted in FIG. 5A, in Landing Order 4, inks are discharged from the nozzle rows 6C and 6M and no inks are discharged from the nozzle rows 6K and 6Y in the preceding recording pass. Meanwhile, inks are discharged from the nozzle rows 6Y and 6K and no inks are discharged from the nozzle rows 6C and 6M in the succeeding recording pass. Namely, in Landing Order 4, the dot D is formed by the cyan, magenta, yellow, and black inks that overlap with each other on the sheet P in that order from below.

As depicted in FIG. 5B, in Landing Order 5, inks are discharged from the nozzle rows 6Y and 6C and no inks are discharged from the nozzle rows 6M and 6K in the preceding recording pass. Meanwhile, inks are discharged from the nozzle rows 6M and 6K and no inks are discharged from the nozzle rows 6Y and 6C in the succeeding recording pass. Namely, in Landing Order 5, the dot D is formed by the yellow, cyan, magenta, and black inks that overlap with each other on the sheet P in that order from below.

The difference in color between the dots D that are formed by different ink landing orders, in which the same color of ink lands on the sheet P first or last, is less conspicuous than the difference in color between the dots D that are formed by different ink landing orders, in which different colors of inks land on the sheet P first and different colors of inks land on the sheet P last. For example, Landing Order 1 (see FIG. 3C) and Landing Order 2 (see FIG. 3D) have the same color of ink landing on the sheet P first (i.e., black). Meanwhile, the color of ink landing on the sheet P first in Landing Order 1 is different from that in Landing Order 4 (see, FIG. 3F), and the color of ink landing on the sheet P last in Landing Order 1 is different from that in Landing Order 4. Thus, the difference in color between the dot D formed by Landing Order 1 and the dot D formed by Landing Order 2 is less conspicuous than the difference in color between the dot D formed by Landing Order 1 and the dot D formed by Landing Order 4.

The difference in color between the dots D that are formed by different ink landing orders that have similar ink landing orders is less conspicuous than the difference in color between the dots D that are formed by different ink landing orders that have completely different ink landing orders. The wording "similar ink landing orders" means that a cumulative value of the differences in landing turns of the respective four inks between one of the ink landing orders and the other of the ink landing orders, is small. For example, the landing turns of the black and yellow inks in Landing Order 1 are identical to those in Landing Order 2. The difference in landing turns of the cyan ink between Landing Order 1 and Landing Order 2 is 1. The difference in landing turns of the magenta ink between Landing Order 1 and Landing Order 2 is 1. The cumulative value is thus 2. Meanwhile, the landing turns of the black ink in Landing Order 2 are identical to those in Landing Order 3. The difference in landing turns of the magenta ink and the cyan ink between Landing Order 2 and Landing Order 3 is 1 and the difference in landing turns of the yellow ink between Landing Order 2 and Landing Order 3 is 2. The cumulative value is thus 4. Namely, Landing Order 1 is more similar to Landing Order 2 than Landing Order 3.

In this embodiment, from the upstream side to the downstream side in the conveyance direction, the ink landing order for each dot D in the overlap area F gradually switches from the landing order similar to Landing Order 1 that is used in the non-overlap area $G_p$ for the preceding recording pass to the landing order similar to Landing Order 6 that is used in the non-overlap area $G_L$ for the succeeding recording pass. Details thereof are described below.

As depicted in FIG. 3B, when the line image T, which belongs to the partial area Fa that is adjacent to the non-overlap area $G_p$ for the preceding recording pass, is recorded, Landing Order 2 is determined as the landing order for forming each dot D of the line image T. The reason thereof is that, among Landing Orders 2 to 5, the color of ink landing on the sheet P first in Landing Order 2 is black, which is the same as Landing Order 1, and Landing Order 2 is the most similar to Landing Order 1 used in the non-overlap area $G_p$. This makes the difference in color between the image recorded in the non-overlap area $G_p$ and the image recorded in the partial area Fa inconspicuous.

When the line image T, which belongs to the partial area Fc that is adjacent to the non-overlap area $G_L$ for the succeeding recording pass, is recorded, Landing Order 4 is determined as the landing order for forming each dot D of the line image T. Among Landing Orders 2 to 5, the color of ink landing on the sheet P last in Landing Order 4 is black, which is the same as Landing Order 6, and Landing Order 4 is the most similar to Landing Order 6 used in the non-overlap area $G_L$. This makes the difference in color between the image recorded in the non-overlap area $G_L$ and the image recorded in the partial area Fc inconspicuous.

When the line image T, which belongs to the partial area Fb that is interposed between the partial area Fa and the partial area Fc, is recorded, Landing Order 3 is determined as the landing order for forming each dot D of the line image T. Among Landing Orders 2 to 5, Landing Order 3 is similar to both Landing Order 2 used in the partial area Fa and Landing Order 4 used in the partial area Fc. This makes the difference in color between the image recorded in the partial area Fa and the image recorded in the partial area Fb inconspicuous, and makes the difference in color between the image recorded in the partial area Fb and the image recorded in the partial area Fc inconspicuous.

The conveyance operation may have an error in conveyance of the sheet P due to, for example, a manufacturing error. The error in conveyance of the sheet P may shift at least one of the landing position on which ink discharged in the preceding recording pass lands and the landing position on which ink discharged in the succeeding recording pass lands, in each line image T of the overlap area F, in the conveyance direction from an ideal landing position. This may cause unevenness in concentration (density) in each line image T of the overlap area F. In that case, when all the dots D of the line image T are formed by the same landing order, the unevenness in concentration may be conspicuous. In view of the above, when the line image T belonging to the overlap area F is recorded in this embodiment, the line image T is made to include dots D that are formed by various ink landing orders. More specifically, when the line image T corresponding to one line is recorded, the line image T is made to include dots D that are formed by using mutually different nozzles 5 of each nozzle row 6.

For example, as depicted in FIG. 3B, the line image T belonging to the partial area Fa is made to include not only dots D formed by Landing Order 2 but also dots D formed by Landing Order 4, which is a reverse order of Landing Order 2. In that case, the nozzles 5 with the symbol #N−2 included in the nozzle rows 6K and 6Y are used for the dot D formed by Landing Order 2, and the nozzles 5 with the symbol #1 included in the nozzle rows 6K and 6Y are used for the dot D formed by Landing Order 4. Further, the nozzles 5 with the symbol #1 included in the nozzle rows 6M and 6C are used for the dot D formed by Landing Order 2, and the nozzles 5 with the symbol #N−2 included in the nozzle rows 6M and 6C are used for the dot D formed by Landing Order 4. This makes unevenness in concentration due to an error in conveyance of the sheet P inconspicuous. The color of ink landing on the sheet P first and the color of ink landing on the sheet P last in Landing Order 4 are different from those of Landing Order 1 used in the non-overlap area $G_p$, and the difference between Landing Order 4 and Landing Order 1 is larger than the difference between Landing Order 2 and Landing Order 1. Thus, when the line image T belonging to the partial area Fa has a larger number of dots D formed by Landing Order 4, the difference in color between the line image T and the image recorded in the non-overlap area $G_p$ may be more conspicuous. In view of the above, in the line image T belonging to the partial area Fa, the number of dots D formed by Landing Order 4 is set to be smaller than the number of dots D formed by Landing Order 2.

Similarly, the line image T belonging to the partial area Fc is made to include not only dots D formed by Landing Order 4 but also dots D formed by Landing Order 2. In the line image T belonging to the partial area Fc, the number of dots D formed by Landing Order 2 is set to be smaller than the number of dots D formed by Landing Order 4. The line image T belonging to the partial area Fb is made to include not only dots D formed Landing Order 3 but also dots D formed by Landing Order 5, which is a reverse order of Landing Order 3.

The discharge control of the inks of respective colors in the preceding recording pass and the succeeding recording pass is executed based on two kinds of mask data for adjusting the landing turn stored in the flash memory 104. The two kinds of mask data are mask data for adjusting the landing turn $M_F$ and mask data for adjusting the landing turn $M_R$. The mask data for adjusting the landing turn $M_F$ is mask data used for the recording pass in which the carriage 2 moves in the FWD direction. The mask data for adjusting the landing turn $M_R$ is mask data used for the recording pass in which the carriage 2 moves in the RVS direction. The pieces of mask data for adjusting the landing turn $M_F$ and $M_R$ are provided for each nozzle row 6, namely, each of the colors of inks.

Figure 6A:
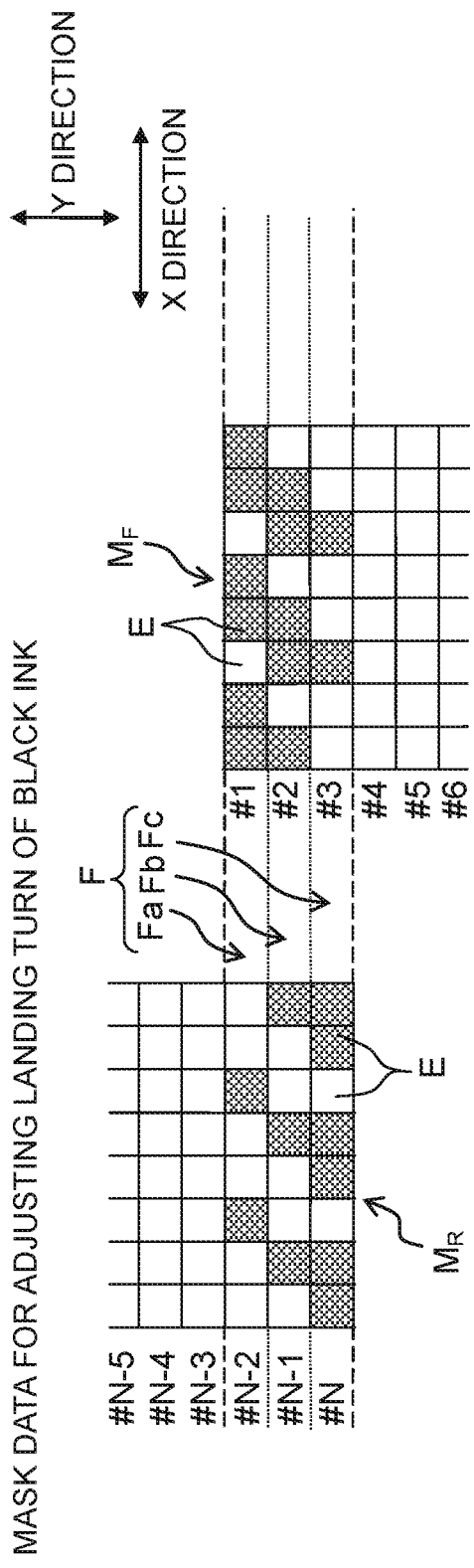
FIG. 6A illustrates mask data for adjusting a landing turn of black ink and a correlation between the mask data and overlapping areas.

FIG. 6A depicts pieces of mask data for adjusting the landing turn $M_F$ and $M_R$ that correspond to the nozzle row 6K from which the black ink is discharged. The pieces of mask data for adjusting the landing turn $M_F$ and $M_R$ are formed by pieces of dot data E arranged lattice-likely in an X direction and a Y direction orthogonal to each other. The X direction corresponds to the scanning direction, and the Y direction corresponds to the conveyance direction. Each dot data E corresponds to the dot D to be formed on the sheet P. The dot data row formed by pieces of dot data E arranged in the X direction corresponds to the line image T. A symbol allocated for the left side of each dot data row of the pieces of mask data $M_F$ and $M_R$ indicates that the dot data row corresponds to what-numbered nozzle 5 from the most upstream side in the conveyance direction. Hatched dot data E indicates that ink discharge from the nozzle 5 (the use of nozzle 5) is allowed, and dot data E that is not subject to hatching indicates that ink discharge from the nozzle 5 is not allowed (the use of the nozzle 5 is not allowed).

The arrangement of the dot data E allowing ink discharge and the dot data E not allowing ink discharge in the dot data row of the dot data E for the overlap area F in the mask data for adjusting the landing turn $M_F$ is opposite to that in the dot data row of the dot data E for the overlap area F in the mask data for adjusting the landing turn $M_R$.

Figure 6B:
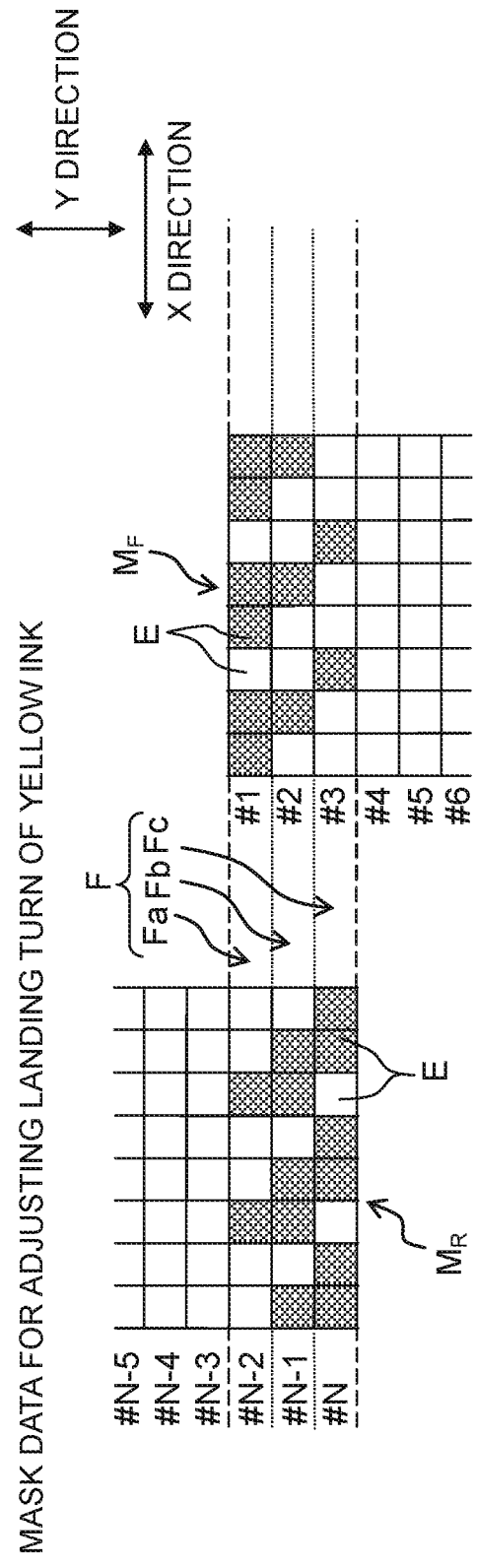
FIG. 6B illustrates mask data for adjusting a landing turn of yellow ink and a correlation between the mask data and overlapping areas.
Figure 6C:
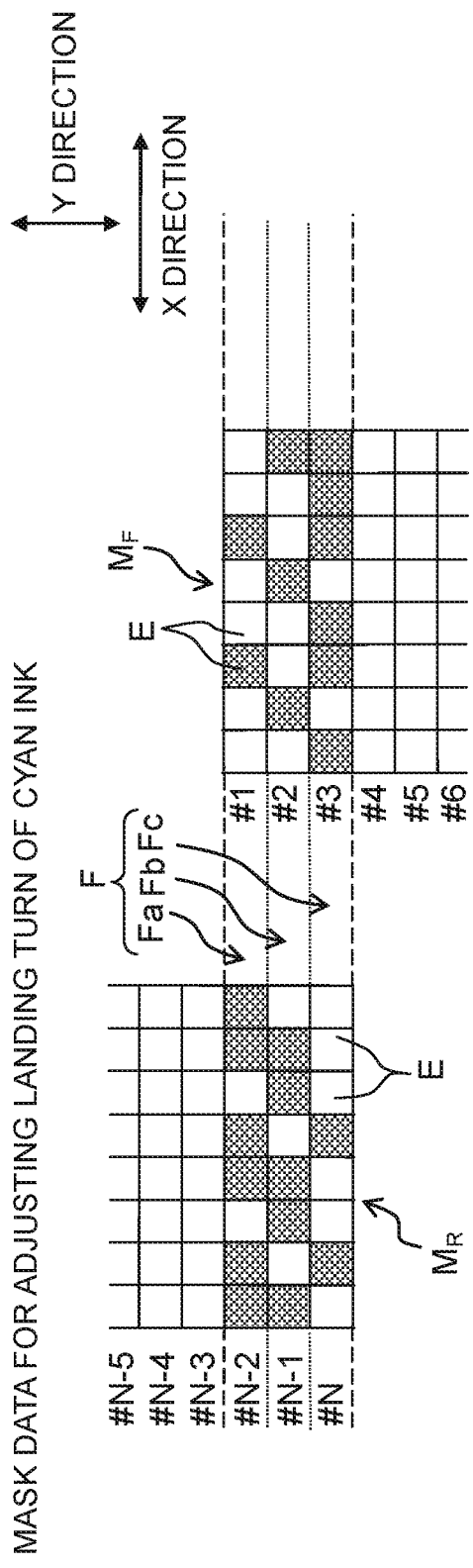
FIG. 6C illustrates mask data for adjusting a landing turn of cyan ink and a correlation between the mask data and overlapping areas.
Figure 6D:
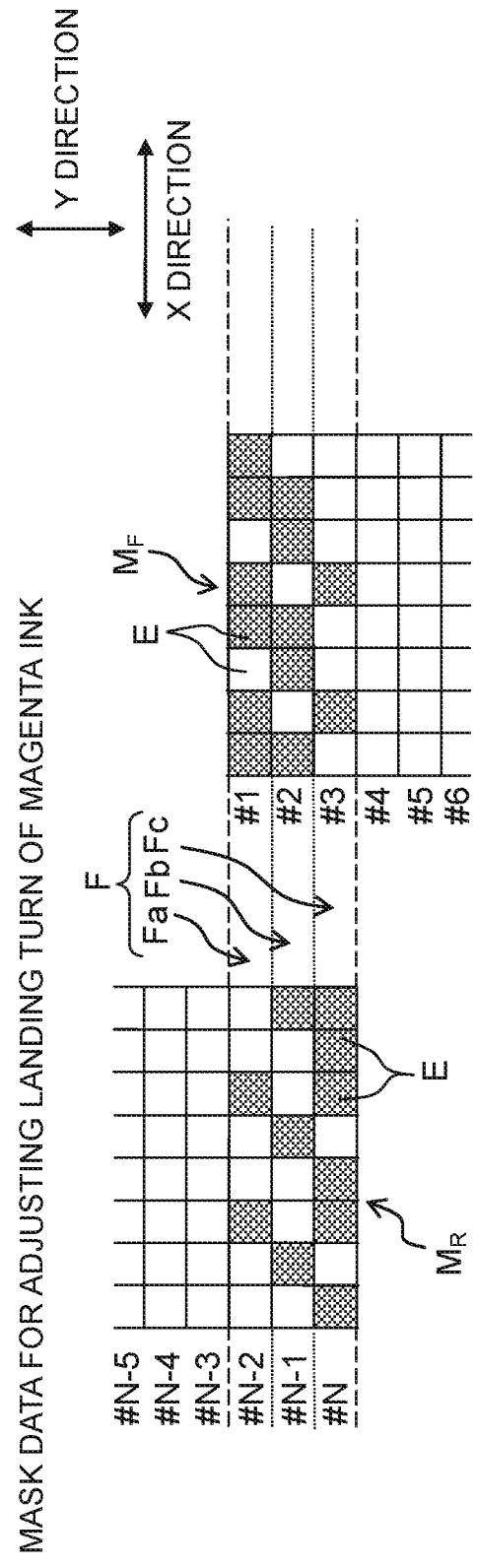
FIG. 6D illustrates mask data for adjusting a landing turn of magenta ink and a correlation between the mask data and overlapping areas.

FIG. 6B depicts pieces of mask data for adjusting the landing turn $M_F$ and $M_R$ that correspond to the nozzle row 6Y from which the yellow ink is discharged. FIG. 6C depicts pieces of mask data for adjusting the landing turn $M_F$ and $M_R$ that correspond to the nozzle row 6C from which the cyan ink is discharged. FIG. 6D depicts pieces of mask data for adjusting the landing turn $M_F$ and $M_R$ that correspond to the nozzle row 6M from which the magenta ink is discharged.

When an image is recorded by two continuous recording passes based on the pieces of mask data for adjusting the landing turn $M_F$ and $M_R$ that correspond to each of the nozzle rows 6, the line image T is formed in the overlap area F.

Subsequently, pieces of processing of the controller 100 executed when the printer 1 records an image on the sheet P are explained. In this embodiment, when a recording command for causing the printer 1 to execute recording is inputted, the controller 100 records an image on the sheet P in accordance with the flowchart of FIG. 7.

Figure 7:
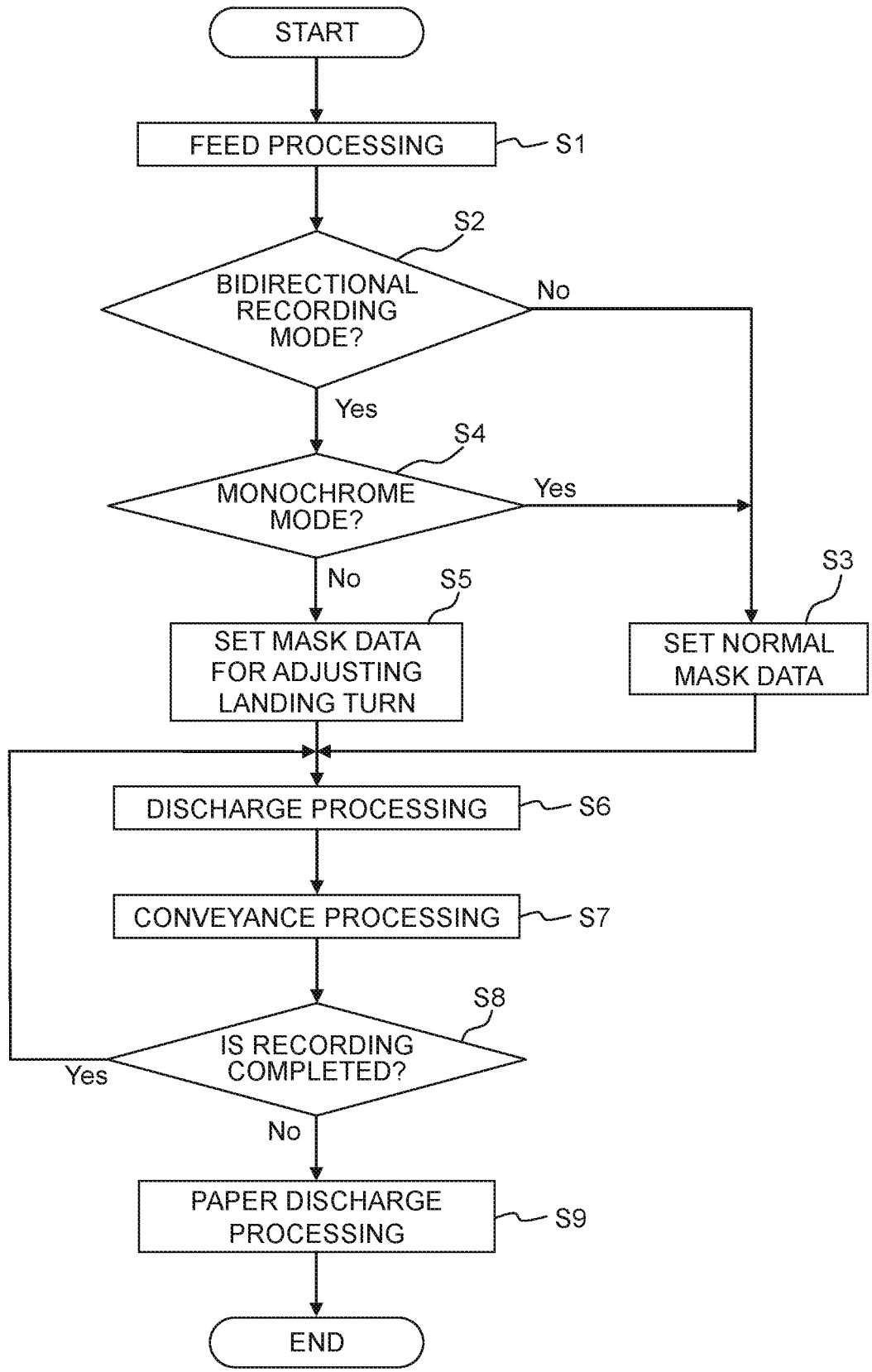
FIG. 7 is a flowchart of operations of the ink-jet printer.

Specifically, as depicted in FIG. 7, the controller 100 controls a feed mechanism (not depicted) to execute feed processing for supplying the sheet P (S1). In the processing of the step S1, the sheet P is supplied to a position where the first recording pass is executed. Next, the controller 100 determines which one of the bidirectional recording mode and the unidirectional recording mode is used for recording (S2). In the processing of the step S2, for example, the controller 100 executes the determination based on a signal inputted together with the recording command and indicating which one of the recording modes is used for recording. Or, the controller 100 executes the determination based on image data stored in the RAM 103.

In the unidirectional recording mode, dots are formed by the same ink landing order in the respective recording passes. Thus, unlike the bidirectional recording mode, the unidirectional recording mode does not have the difference in color due to various ink landing orders. This eliminates the necessity to convey the sheet P so that the recording area $K_p$ partially overlaps with the recording area $K_L$ in the conveyance operation executed between two continuous recording passes.

However, when the unidirectional recording mode has an error in conveyance of the sheet P in the conveyance operation, unevenness in concentration, such as a streak-like unevenness along the scanning direction, may appear at a boundary between images recorded by two continuous recording passes. In order to solve that problem, in the unidirectional recording mode of this embodiment, the controller 100 conveys the sheet P so that the recording area $K_p$ partially overlaps with the recording area $K_L$ in the conveyance operation executed between two continuous recording passes. When the line image T belonging to the overlap area F where the recording area $K_p$ overlaps with the recording area $K_L$ is recorded, the controller 100 uses different nozzles 5 of each nozzle row 6 in each of the two continuous recording passes, and records a thinned-out image in which part of the line image T is thinned out based on the normal mask data Y stored in the RAM 103.

In that configuration, when the controller 100 has determined in the processing of the step S2 that recording is executed by the unidirectional recording mode (S2: NO), the controller 100 sets the normal mask data Y, as the mask data to be used in each recording pass, for each nozzle row 6 (S3). The normal mask data Y is common to the four nozzle rows 6. Thus, when an image is recorded by the unidirectional recording mode, each line image T of the overlap area F only includes the dot D formed by Landing Order 1 and the dot D formed by Landing Order 6. After completion of the processing of the step S3, the controller 100 proceeds to processing of a step S6.

When the controller 100 has determined in the processing of the step S2 that recording is executed by the bidirectional recording mode (S2: YES), the controller 100 determines which one of a monochrome mode and a color mode is used for recording (S4). In the monochrome mode, an image is recorded by using only the nozzle row 6K from which the black ink is discharged. In the color mode, an image is recorded by using the four nozzle rows 6. In the processing of the step S3, for example, the controller 100 executes the determination based on a signal inputted together with the recording command and indicating which one of the monochrome mode and the color mode is used for image recording. Or, the controller 100 executes the determination based on image data stored in the RAM 103.

When recording is executed by the bidirectional recording mode, the recording may be executed by the monochrome mode using only the nozzle row 6K. In that case, similar to the unidirectional recording mode, the difference in color due to various ink landing orders is not caused. Thus, when the controller 100 has determined that recording is executed by the monochrome mode (S4: NO), the controller 100 sets the normal mask data Y, as the mask data to be used in each of the recording passes, for the nozzle row 6K (S3). Then, the controller 100 proceeds to the processing of the step S6.

When the controller 100 has determined that recording is executed by the color mode (S4: YES), the controller 100 sets the pieces of mask data for adjusting the landing turn $M_F$ and $M_R$ corresponding to each of the nozzle rows 6, as the mask data to be used in each of the recording passes, for each of the nozzle rows 6 (S5). After completion of the processing of the step S5, the controller 100 proceeds to the processing of the step S6.

In the processing of the step S6, discharge processing is executed. In the processing of the step S6, the controller 100 controls the carriage motor 16 and the head 3 to execute the recording pass. The mask data set in the processing of the step S3 or the processing of the step S5 processing is used as the mask data to be used in the recording pass of the processing of the step S6.

Subsequently, the controller 100 executes conveyance processing (S7). In the processing of the S7, the controller 100 controls the conveyance motor 44 to convey the sheet P in the conveyance direction by a predefined conveyance amount. In this embodiment, the predefined conveyance amount when recording is executed by the bidirectional recording mode is set to be the same as the predefined conveyance amount when recording is executed by the unidirectional recording mode. Namely, the length in the conveyance direction of the overlap area F when recording is executed by the bidirectional recording mode is the same as the length in the conveyance direction of the overlap area F when recording is executed by the unidirectional recording mode.

When recording of the image on the sheet P is completed (S8: YES), the controller 100 controls the conveyance motor 44 so that the conveyance rollers 42 and 43 execute discharge processing for discharging the sheet P (S9). Then, the controller 100 ends the series of processing. When recording of the image on the sheet P is not completed (S8: NO), the controller 100 returns to the processing of the step S6.

According to this embodiment, the line image T of the overlap area F interposed between the two non-overlap areas $G_p$ and $G_L$ for two continuous recording passes includes a dot D formed by a landing order different from Landing Orders 1 and 6, which correspond to the two non-overlap areas $G_p$ and $G_L$. Namely, the dot D, which is formed in the overlap area F in accordance with the landing order different from Landing Orders 1 and 6, is interposed between the dots D in the two non-overlap areas $G_p$ and $G_L$. This separates the dot D formed by Landing Order 1 from the dot D formed by Landing Order 6, thereby making deterioration of an image quality due to various landing orders inconspicuous.

When the line image T of the overlap area F is recorded, inks are discharged from the four nozzle rows 6 so that the line image T includes dots D formed by various ink landing orders. This eliminates or reduces unevenness in concentration, such as a streak-like unevenness along the scanning direction, due to an error in conveyance of the sheet P.

The line image T belonging to the partial area Fa that is adjacent to the non-overlap area $G_p$ includes the dot D formed by Landing Order 2, which is similar to Landing Order 1. The color of ink landing on the sheet P first in Landing Order 2 is the same as that of Landing Order 1 used in the non-overlap area $G_p$. Similarly, the line image T belonging to the partial area Fc that is adjacent to the non-overlap area $G_L$ includes the dot D formed by Landing Order 4, which is similar to Landing Order 6. The color of ink landing on the sheet P last in Landing Order 4 is the same as that of Landing Order 6 used in the non-overlap area $G_L$. This makes deterioration of an image quality caused at a boundary between the non-overlap area $G_p$ and the partial area Fa and a boundary between the non-overlap area $G_L$ and the partial area Fc, inconspicuous.

Although the embodiment of the present disclosure is explained above, the present disclosure is not limited to the embodiment. Various modifications can be applied to the embodiment within the appended claims.

Figure 8A:
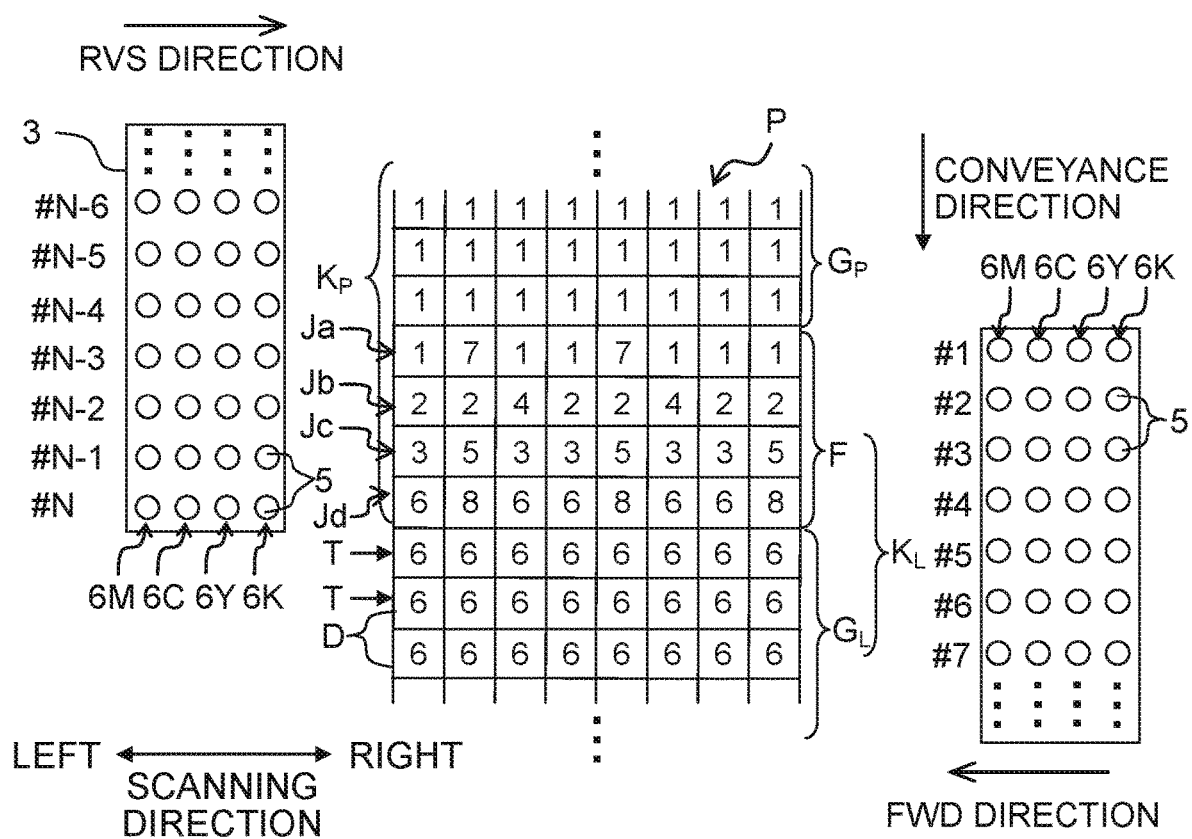
FIG. 8A illustrates landings orders of inks of different colors used when dots are formed in recording areas where images are recorded by two continuous recording passes according to a modified embodiment.

In a modified embodiment depicted in FIG. 8A, dots D in the overlap area F include the dot D formed by Landing Order 1 used for forming the dot D in the non-overlap area $G_p$ and the dot D formed by Landing Order 6 used for forming the dot D in the non-overlap area $G_L$. Specifically, the overlap area F includes four partial areas Ja to Jd each of which has the line image T corresponding to one line. The line image T belonging to the partial area Ja, which is included in the four partial areas Ja to Jd and is adjacent to the non-overlap area $G_p$, includes the dot D formed by Landing Order 1 used for forming the dot D in the non-overlap area $G_p$. Similarly, the line image T belonging to the partial area Jd, which is included in the four partial areas Ja to Jd and is adjacent to the non-overlap area $G_L$, includes the dot D formed by Landing Order 6 used for forming the dot D in the non-overlap area $G_L$. The landing order of each dot D of the line image T belonging to the partial area Jb is the same as the landing order of each dot D of the line image T belonging to the partial area Fa. The landing order of each dot D of the line image T belonging to the partial area Jc is the same as the landing order of each dot D of the line image T belonging to the partial area Fb.

In order to eliminate or reduce unevenness in concentration due to, for example, an error in conveyance of the sheet P, the following condition is desirably satisfied: the line image T recorded in the overlap area F includes the dot D formed by mutually different nozzles 5 of each nozzle row 6. However, when the line image T includes the dot D formed by Landing Order 1, the line image T is required to include the dot D formed by Landing Order 6, which a reverse order of Landing Order 1, in order to satisfy the above condition. In that case, the dot D formed by Landing Order 1 used in the non-overlap area $G_p$ is adjacent to the dot D formed by Landing Order 6 used in the non-overlap area $G_L$. This may make the difference in color between the dot D formed by Landing Order 1 and the dot D formed by Landing Order 6 in the line image T, conspicuous.

In order to solve that problem, in this modified embodiment, when the dots D of the line image T, which include the dot D formed by Landing Order 1 and belong to the partial area Ja, is formed, the same nozzle 5 is used for at least one nozzle row 6 of the four nozzle rows 6. Specifically, the yellow ink is less likely to have conspicuous unevenness in concentration than the remaining other inks even when the actual landing position of the yellow ink is shifted in the conveyance direction from the ideal landing position. Thus, the same nozzle 5 is used for the nozzle row 6Y of the four nozzle rows 6. Specifically, the line image T belonging to the partial area Ja is made to include not only the dot D formed by Landing Order 1 but also the dot D formed by Landing Order 7.

Figure 8C:
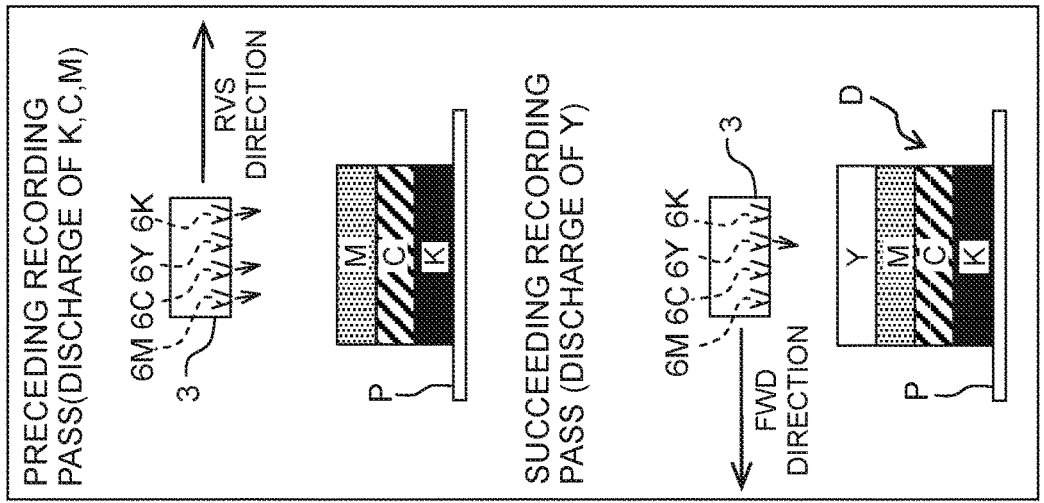
FIG. 8C illustrates Landing Order 8.
Figure 8B:
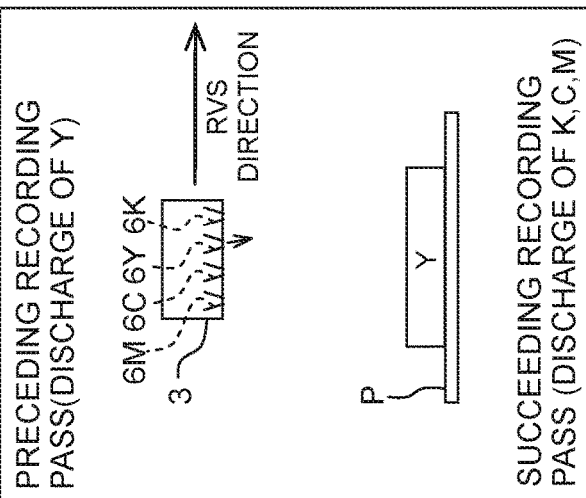
FIG. 8B illustrates Landing Order 7.

As depicted in FIG. 8B, in Landing Order 7, ink is discharged from the nozzle row 6Y and no inks are discharged from the nozzle rows 6K, 6C, and 6M in the preceding recording pass. Meanwhile, inks are discharged from the nozzle rows 6M, 6C, and 6K and no ink is discharged from the nozzle row 6Y in the succeeding recording pass. Namely, in Landing Order 7, the dot D is formed by the yellow, magenta, cyan, and black inks that overlap with each other on the sheet P in that order from below.

When the dots D of the line image T, which include the dot D formed by Landing Order 6 and belong to the partial area Jd, are formed, the same nozzle 5 is used for the nozzle row 6Y. Specifically, the line image T belonging to the partial area Jd is made to include not only the dot D formed by Landing Order 6 but also the dot D formed by Landing Order 7.

As depicted in FIG. 8C, in Landing Order 8, inks are discharged from the nozzle rows 6K, 6C, and 6M, and no ink is discharged from the nozzle row 6Y in the preceding recording pass. Meanwhile, ink is discharged from the nozzle row 6Y and no inks are discharged from the nozzle rows 6K, 6C, and 6M in the succeeding recording pass. Namely, in Landing Order 8, the dot D is formed by the black, cyan, magenta, and yellow inks that overlap with each other on the sheet P in that order from below.

In the above configuration according to this modified embodiment, even when the dots D in the overlap area F include the dot D formed by Landing Order 1 and the dot D formed by Landing Order 6, deterioration of an image quality due to various ink landing orders is inconspicuous while eliminating or reducing unevenness in concentration due to, for example, an error in conveyance of the sheet P.

Other modified embodiments are explained below.

In the above embodiment, each line image T in the overlap area F is made to include dots D formed by different ink landing orders. The present disclosure, however, is not limited thereto. All the dots D of each line image T in the overlap area F may be dots D formed by the same ink landing order.

The number of line images T included in each of the partial areas Fa, Fb, and Fc is not limited to one. The partial areas Fa, Fb, and Fc may have different number of line images T. The overlap area F may not include multiple partial areas. Namely, the dots D included in each line image T in the overlap area F may be dots formed by the same ink landing order.

The length in the conveyance direction of the overlap area F when recording is executed in the unidirectional recording mode may be different from that when recording is executed in the bidirectional recording mode. In the unidirectional recording mode, the length in the conveyance direction of the overlap area F may be zero. Namely, the recording areas $K_P$ and $K_L$ formed by two continuous recording passes may not overlap with each other.

In the bidirectional recording mode, the length in the conveyance direction of the overlap area F may be changed and/or the number of partial areas may be increased depending on a predefined condition. For example, it is possible to determine, based on image data, whether an image to be recorded on the sheet P is an image in which the difference in color due to various ink landing orders is conspicuous. Thus, for example, when it has been determined that the image in which the difference in color due to various ink landing orders is conspicuous is to be recorded across a boundary between the recording areas $K_P$ and $K_L$ recorded by two continuous recording passes, the length in the conveyance direction of the overlap area F may be lengthened and the number of partial areas may be increased.

In the above embodiment, the black ink is a pigment ink, and the yellow, cyan, and magenta inks are dye inks. The present disclosure, however, is not limited thereto. For example, all the four inks may be pigment inks. In that case, when the pigment concentration of black ink is higher than those of the yellow, cyan, and magenta inks, and when the nozzle row 6K is arranged at an end in the scanning direction of the four nozzle rows 6, the difference in color due to various ink landing orders is likely to be conspicuous. All the four inks may be dye inks, ultraviolet (UV) cure inks, or the like.

The nozzle row 6K from which the black ink is discharged is not required to be arranged at an end in the scanning direction of the four nozzle rows. It is not indispensable for the head 3 to include the four nozzle rows 6. The head 3 may include at least three nozzle rows from which mutually different kinds of inks are discharged. For example, the head 3 may only include three nozzle rows from which the yellow, cyan, and magenta inks are discharged, respectively.

The above explanation is an example in which the present disclosure is applied to the printer that records an image on the recording sheet P by discharging inks from nozzles. The present disclosure, however, is not limited thereto. The present disclosure may be applied to an image recording apparatus that records an image on any other recording medium than the recording sheet P, such as cardboard and cases of mobile terminals including smartphones, by discharging inks from nozzles. The present disclosure may be applied to an image recording apparatus that records an image on a recording medium made by using a transparent resin, such as a transparent film, by performing printing of white ink as undercoating and then discharging black, yellow, cyan, and magenta inks from a head. The present disclosure may be applied to an image recording apparatus that records an image on a recording medium by use of any other liquid than ink.

In the above embodiment and modified embodiments, the conveyance mechanism conveying the recording medium is a roller conveyance mechanism using the conveyance rollers. The present disclosure, however, is not limited thereto. For example, it is possible to use a conveyance mechanism in which a recording medium placed on a belt is conveyed by causing the belt to run. Or, it is possible to use a conveyance mechanism in which a recording medium placed on a table is conveyed by causing a moving mechanism, such as a ball screw, to move the table.

What is claimed is:

1. An image recording apparatus, comprising:
a conveyer configured to convey a recording medium in a conveyance direction;
a carriage configured to move in a scanning direction intersecting with the conveyance direction;
a recording head carried on the carriage and having at least three nozzle rows, each of the nozzle rows having a plurality of nozzles arrayed in the conveyance direction, the nozzle rows being configured to discharge different kinds of liquids, the at least three nozzle rows being arranged in the scanning direction; and
a controller configured to control the conveyer, the carriage, and the recording head to record an image on the recording medium by alternatingly executing a recording pass, in which the recording head discharges the liquids from the at least three nozzle rows to the recording medium during the movement of the carriage in the scanning direction, and a conveyance operation in which the conveyer conveys the recording medium in the conveyance direction,
wherein, in a case that the image is recorded, that the recording pass is executed twice continuously, and that a moving direction in the scanning direction of the carriage in one of the two continuous recording passes is different from a moving direction in the scanning direction of the carriage in the other of the two continuous recording passes,
the controller is configured to control the conveyer to convey the recording medium in the conveyance direction in the conveyance operation such that two recording areas in the recording medium where the image is recorded by the two continuous recording passes, partially overlap with each other,
in a preceding recording pass of the two continuous recording passes, in a case that a line image corresponding to one line, which includes a plurality of dots arranged in the scanning direction and corresponds to a first non-overlap area included in the recording area of the preceding recording pass, is recorded, and in a case that the line image does not overlap with the recording area of a succeeding recording pass of the two continuous recording passes, the controller is configured to form each of the dots in accordance with a first landing order in which each of the liquids is discharged from one of the nozzle rows in order starting from the nozzle row which is included in the at least three nozzle rows and positioned at the most downstream side in the moving direction in the scanning direction of the carriage in the preceding recording pass,
in the succeeding recording pass of the two continuous recording passes, in a case that the line image, which corresponds to a second non-overlap area included in the recording area of the succeeding recording pass, is recorded, and in a case that the line image does not overlap with the recording area of the preceding recording pass, the controller is configured to form each of the dots in accordance with a second landing order in which each of the liquids is discharged from one of the nozzle rows in order starting from the nozzle row which is included in the at least three nozzle rows and positioned at the most downstream side in the moving direction in the scanning direction of the carriage in the succeeding recording pass, and
in a case that the line image, which corresponds to an overlap area where the two recording areas for the two continuous recording passes overlap with each other, is recorded, the controller is configured to execute recording such that the preceding recording pass and the succeeding recording pass complement each other, and to cause the liquids to be discharged from the at least three nozzle rows such that at least part of the dots in the line image is formed in accordance with a landing order different from the first landing order and the second landing order.

2. The image recording apparatus according to claim 1, wherein in the case that the line image in the overlap area is recorded, the controller is configured to control the recording head to discharge the liquids from the at least three nozzle rows in the two continuous recording passes such that the dots included in the line image include a plurality of dots formed by mutual different landing orders.

3. The image recording apparatus according to claim 1, wherein in the case that the image is recorded, and in a case that the moving direction in the scanning direction of the carriage in the one of the two continuous recording passes is different from that in the other of the two continuous recording passes,
the controller is configured to control the conveyer to convey the recording medium in the conveyance direction in the conveyance operation such that the overlap area for the two continuous recording passes includes a plurality of partial areas each including the line image corresponding to at least one line, and
the controller is configured to control the recording head to discharge the liquids from the at least three nozzle rows in the two continuous recording passes such that the dots of the line image corresponding to one of the partial areas include a dot formed by a first different landing order being different from the first landing order, the second landing order, and a landing order used in a case that the dots of the line image corresponding to another partial area which is included in the partial areas and is adjacent to the one of the partial areas are formed.

4. The image recording apparatus according to claim 3, wherein, in a case that the line image, which corresponds to a partial area included in the partial areas and adjacent to the first non-overlap area, is recorded, the controller is configured to control the recording head to discharge the liquids from the at least three nozzle rows in the two continuous recording passes such that the dots of the line image include a dot formed by a second different landing order being different from the first landing order and the second landing order, a kind of the liquid landing on the recording medium first or last in the second different landing order being identical to that of the first landing order, and in a case that the line image, which corresponds to a partial area included in the partial areas and adjacent to the second non-overlap area, is recorded, the controller is configured to control the recording head to discharge the liquids from the at least three nozzle rows in the two continuous recording passes such that the dots of the line image include a dot formed by a third different landing order being different from the first landing order and the second landing order, a kind of the liquid landing on the recording medium first or last in the third different landing order being identical to that of the second landing order.

5. The image recording apparatus according to claim 3, wherein, in a case that the line image, which corresponds to a partial area included in the partial areas and adjacent to the first non-overlap area, is recorded, the controller is configured to control the recording head to discharge the liquids from the at least three nozzle rows in the two continuous recording passes such that the dots of the line image include a dot formed by a fourth different landing order being different from the first landing order and the second landing order, the fourth different landing order being more similar to the first landing order than a landing order used in a case that the dots of the line image corresponding to any other partial area included in the partial areas are formed, and
in a case that the line image, which corresponds to a partial area included in the partial areas and adjacent to the second non-overlap area, is recorded, the controller is configured to control the recording head to discharge the liquids from the at least three nozzle rows in the two continuous recording passes such that the dots of the line image include a dot formed by a fifth different landing order being different from the first landing order and the second landing order, the fifth different landing order being more similar to the second landing order than a landing order used in a case that the dots of the line image corresponding to any other partial area included in the partial areas are formed.

6. The image recording apparatus according to claim 1, wherein the at least three nozzle rows include a specified nozzle row positioned at an end in the scanning direction of the at least three nozzle rows, wherein the specific nozzle is configured to discharge liquid having an optical density higher than those of the other remaining nozzle rows.

7. The image recording apparatus according to claim 1, wherein a pigment ink is discharged from each of the at least three nozzle rows, and
the at least three nozzle rows include a specified nozzle row positioned at an end in the scanning direction of the at least three nozzle rows, wherein the specific nozzle is configured to discharge a pigment ink having a pigment concentration higher than those of the other remaining nozzle rows.

8. The image recoding apparatus according to claim 1, wherein the at least three nozzle rows include a specified nozzle row positioned at an end in the scanning direction of the at least three nozzle rows. wherein the specific nozzle row is configured to discharge liquid being less likely to permeate the recording medium than those of the other remaining nozzle rows.

9. The image recording apparatus according to claim 1, wherein the recording head includes, as the at least three nozzle rows, four nozzle rows, the four nozzle rows are configured to discharge liquids of different colors, and the four nozzle rows include a specified nozzle row configured to discharge black liquid, and
the specified nozzle row is a nozzle row positioned at an end in the scanning direction of the four nozzle rows.

* * * * *